US010614462B2

(12) United States Patent
Johnson

(10) Patent No.: US 10,614,462 B2
(45) Date of Patent: Apr. 7, 2020

(54) SECURITY ASPECTS OF A SELF-AUTHENTICATING CREDIT CARD

(71) Applicant: ClevX, LLC, Kirkland, WA (US)

(72) Inventor: Simon B. Johnson, Bonney Lake, WA (US)

(73) Assignee: ClevX, LLC, Kirkland, WA (US)

( * ) Notice: Subject to any disclaimer, the term of this patent is extended or adjusted under 35 U.S.C. 154(b) by 865 days.

(21) Appl. No.: 13/734,653

(22) Filed: Jan. 4, 2013

(65) Prior Publication Data

US 2014/0195441 A1 Jul. 10, 2014

Related U.S. Application Data

(63) Continuation-in-part of application No. 12/680,549, filed as application No. PCT/US2008/077765 on Sep. 26, 2008, now Pat. No. 10,223,856.

(60) Provisional application No. 60/975,356, filed on Sep. 26, 2007.

(51) Int. Cl.
*G06Q 20/40* (2012.01)
*G06Q 20/34* (2012.01)
*G07F 7/08* (2006.01)

(52) U.S. Cl.
CPC ....... *G06Q 20/4012* (2013.01); *G06Q 20/352* (2013.01); *G07F 7/0813* (2013.01); *G07F 7/0846* (2013.01); *G07F 7/0853* (2013.01)

(58) Field of Classification Search
USPC ......................................................... 705/72
See application file for complete search history.

(56) References Cited

U.S. PATENT DOCUMENTS

| 3,624,938 | A | * | 12/1971 | Richard | G06K 19/067 |
| | | | | | 283/83 |
| 4,408,119 | A | * | 10/1983 | Decavele | G06Q 20/341 |
| | | | | | 235/380 |
| 5,623,552 | A | * | 4/1997 | Lane | G06K 13/073 |
| | | | | | 235/492 |
| 6,257,486 | B1 | | 7/2001 | Teicher et al. | |

(Continued)

FOREIGN PATENT DOCUMENTS

| KR | 20020045187 A | 6/2002 |
| KR | 20030033888 A | 5/2003 |

(Continued)

OTHER PUBLICATIONS

"U.S. Appl. No. 12/680,549, Advisory Action dated Apr. 19, 2016", 3 pgs.

(Continued)

*Primary Examiner* — Abhishek Vyas
*Assistant Examiner* — Murali K Dega
(74) *Attorney, Agent, or Firm* — Schwegman Lundberg & Woessner, P.A.

(57) ABSTRACT

A self-authenticating credit card includes an input device for entering a PIN. The PIN is accepted by a micro-controller that uses the entered PIN as an encryption key for decrypting stored account information. A portion of the account information includes data, that when decrypted, contains an image that is rendered on an integral display, with account information sent to a transaction terminal. A timer is used to limit access to account data while in the unlocked state.

20 Claims, 3 Drawing Sheets

(56) References Cited

U.S. PATENT DOCUMENTS

| | | | |
|---|---|---|---|
| 6,954,133 B2 * | 10/2005 | McGregor | G05B 19/0425 |
| | | | 235/375 |
| 7,069,447 B1 | 6/2006 | Corder | |
| 8,832,440 B2 | 9/2014 | Johnson et al. | |
| 9,075,571 B2 | 7/2015 | Bolotin et al. | |
| 9,262,611 B2 | 2/2016 | Johnson et al. | |
| 2001/0034717 A1 | 10/2001 | Whitworth | |
| 2002/0153424 A1 | 10/2002 | Li | |
| 2003/0075610 A1 | 4/2003 | Ong | |
| 2003/0085286 A1 | 5/2003 | Kelley | |
| 2003/0177347 A1 * | 9/2003 | Schneier | A63F 13/12 |
| | | | 713/151 |
| 2005/0086471 A1 | 4/2005 | Spencer | |
| 2006/0213972 A1 * | 9/2006 | Kelley | G06K 7/0008 |
| | | | 235/380 |
| 2007/0214093 A1 * | 9/2007 | Colella | G06Q 20/04 |
| | | | 705/67 |
| 2008/0029607 A1 | 2/2008 | Mullen | |
| 2010/0230487 A1 | 9/2010 | Johnson et al. | |
| 2016/0119339 A1 | 4/2016 | Bolotin et al. | |
| 2016/0259736 A1 | 9/2016 | Bolotin et al. | |

FOREIGN PATENT DOCUMENTS

| | | |
|---|---|---|
| TW | 200915235 | 4/2009 |
| WO | 8809019 A1 | 11/1988 |
| WO | 2001061640 A1 | 8/2001 |
| WO | 2007057603 A1 | 5/2007 |
| WO | WO-2009042819 | 4/2009 |

OTHER PUBLICATIONS

"U.S. Appl. No. 12/680,549, Advisory Action dated Nov. 16, 2012", 3 pgs.

"U.S. Appl. No. 12/680,549, Final Office Action dated Feb. 10, 2016", 8 pgs.

"U.S. Appl. No. 12/680,549, Final Office Action dated Sep. 6, 2012", 8 pgs.

"U.S. Appl. No. 12/680,549, Final Office Action dated Oct. 17, 2011", 7 pgs.

"U.S. Appl. No. 12/680,549, Final Office Action dated Nov. 22, 2016", 8 pgs.

"U.S. Appl. No. 12/680,549, Non Final Office Action dated Apr. 1, 2011", 7 pgs.

"U.S. Appl. No. 12/680,549, Non Final Office Action dated May 23, 2012", 7 pgs.

"U.S. Appl. No. 12/680,549, Non Final Office Action dated Jul. 29, 2016", 8 pgs.

"U.S. Appl. No. 12/680,549, Non Final Office Action dated Oct. 26, 2015", 9 pgs.

"U.S. Appl. No. 12/680,549, Response filed Jan. 17, 2012 to Final Office Action dated Oct. 17, 2011", 4 pgs.

"U.S. Appl. No. 12/680,549, Response filed Jan. 25, 2016 to Non Final Office Action dated Oct. 26, 2015", 8 pgs.

"U.S. Appl. No. 12/680,549, Response filed Apr. 5, 2017 to Final Office Action dated Nov. 22, 2016", 11 pgs.

"U.S. Appl. No. 12/680,549, Response filed Apr. 12, 2016 to Final Office Action dated Feb. 10, 2016", 11 pgs.

"U.S. Appl. No. 12/680,549, Response filed Jul. 15, 2011 to Non Final Office Action dated Apr. 1, 2011", 10 pgs.

"U.S. Appl. No. 12/680,549, Response filed Aug. 23, 2012 to Non Final Office Action dated May 23, 2012", 11 pgs.

"U.S. Appl. No. 12/680,549, Response filed Oct. 28, 2016 to Non Final Office Action dated Jul. 29, 2016", 10 pgs.

"U.S. Appl. No. 12/680,549, Response filed Nov. 9, 2012 to Final Office Action dated Sep. 6, 2012", 10 pgs.

"International Application Serial No. PCT/US2008/077765, International Preliminary Report on Patentability dated Mar. 30, 2010", 5 pgs.

"International Application Serial No. PCT/US2008/077765, International Search Report dated Mar. 31, 2009", 2 pgs.

"International Application Serial No. PCT/US2008/077765, Written Opinion dated Mar. 31, 2009", 4 pgs.

"U.S. Appl. No. 12/680,549, Final Office Action dated Oct. 12, 2017", 8 pgs.

"U.S. Appl. No. 12/680,549, Non Final Office Action dated Jul. 11, 2017", 8 pgs.

"U.S. Appl. No. 12/680,549, Response filed Sep. 27, 2017 to Non Final Office Action dated Jul. 11, 2017", 11 pgs.

"U.S. Appl. No. 12/680,549, Non Final Office Action dated Jun. 6, 2018", 8 pgs.

"U.S. Appl. No. 12/680,549, Response filed Jan. 10, 2018 to Final Office Action dated Oct. 12, 2017", 9 pgs.

* cited by examiner

SECURITY ASPECTS OF A SELF-AUTHENTICATING CREDIT CARD

CROSS REFERENCE TO RELATED APPLICATIONS

This application is a Continuation-in-Part of prior pending patent application Ser. No. 12/680,549 to Simon B. Johnson et al., entitled "SELF-AUTHENTICATING CREDIT CARD SYSTEM."

STATEMENT REGARDING FEDERALLY SPONSORED RESEARCH OR DEVELOPMENT

Not applicable.

FIELD OF THE INVENTION

The present invention relates generally to credit cards/tokens and more particularly to a means of providing additional security to credit cards and transactions without changing underlying infrastructure.

BACKGROUND OF THE INVENTION

Credit cards are ubiquitous with monetary transactions. They are used in a number of scenarios to purchase groceries, restaurant meals, retail/online products, gas, or just about anything. Most often a cash or check transaction can be replaced with a credit/debit card.

False charges create a tremendous burden on financial institutions and card holder alike. A lost or stolen card can easily be used by an unauthorized user to make purchases. Within several hours of obtaining a lost or stolen card, a thief can fraudulently charge thousands of dollars before a notification process can stop use of the card.

Some safeguard procedures have been put into place:
1. Retail clerk verifies customer signature matches that on the back of card.
2. Retail clerk verifies customer ID matches the name on card.
3. Authorization center uses sophisticated buying profiles to identify a potentially unauthorized purchase.

These safeguard procedures are not always performed at the point of sale, for example, a gas purchase. Many retail outlets do not require a signature for authentication with purchases under $50, nor does the retail clerk check the card carrier's ID.

There is accordingly an unmet need in the art to provide additional security to the use of credit cards while using the existing underlying infrastructure without changes.

An example of a prior art device is shown in U.S. Pat. No. 6,954,133, entitled Biometric smart card, biometric smart card reader, and method use issued Oct. 11, 2005, to Travis M. McGregor et al. McGregor claims an alternate means of exchanging data between authenticating bank and card to make transactions more secure.

Another example of a prior art device is shown in U.S. Pat. No. 4,667,087, entitled Secure Credit Card, issued May 19, 1987 to Max A. Quintana. Quintana teaches a means of obscuring critical account information until a user PIN is supplied.

It is the goal of the present invention to use the policies and equipment of existing infrastructure for credit card purchases. In addition, the present invention provides a means of managing internal account data of a credit card to prevent unauthorized use.

SUMMARY OF THE INVENTION

The present invention relates generally to credit cards/tokens and more particularly to a means of providing an additional layer of security to existing credit cards.

The apparatus and system according to the present invention provides a credit card with a display and integrated input mechanism that is electrically connected to a micro-controller equipped with internal memory. A user PIN is entered via the input mechanism and used to decrypt account data stored within the micro-controller's memory. The decrypted account data is then rendered on the integral display and sent to a transaction terminal when making a purchase.

Certain embodiments of the invention have other aspects in addition to or in place of those mentioned above. These aspects will become apparent to those skilled in the art from a reading of the following detailed description when taken with reference to the accompanying drawings.

Other objects and advantages of the present invention will be more readily apparent from the following detailed description when read in conjunction with the accompanying drawings.

DETAILED DESCRIPTION OF THE INVENTION

Figure 1:
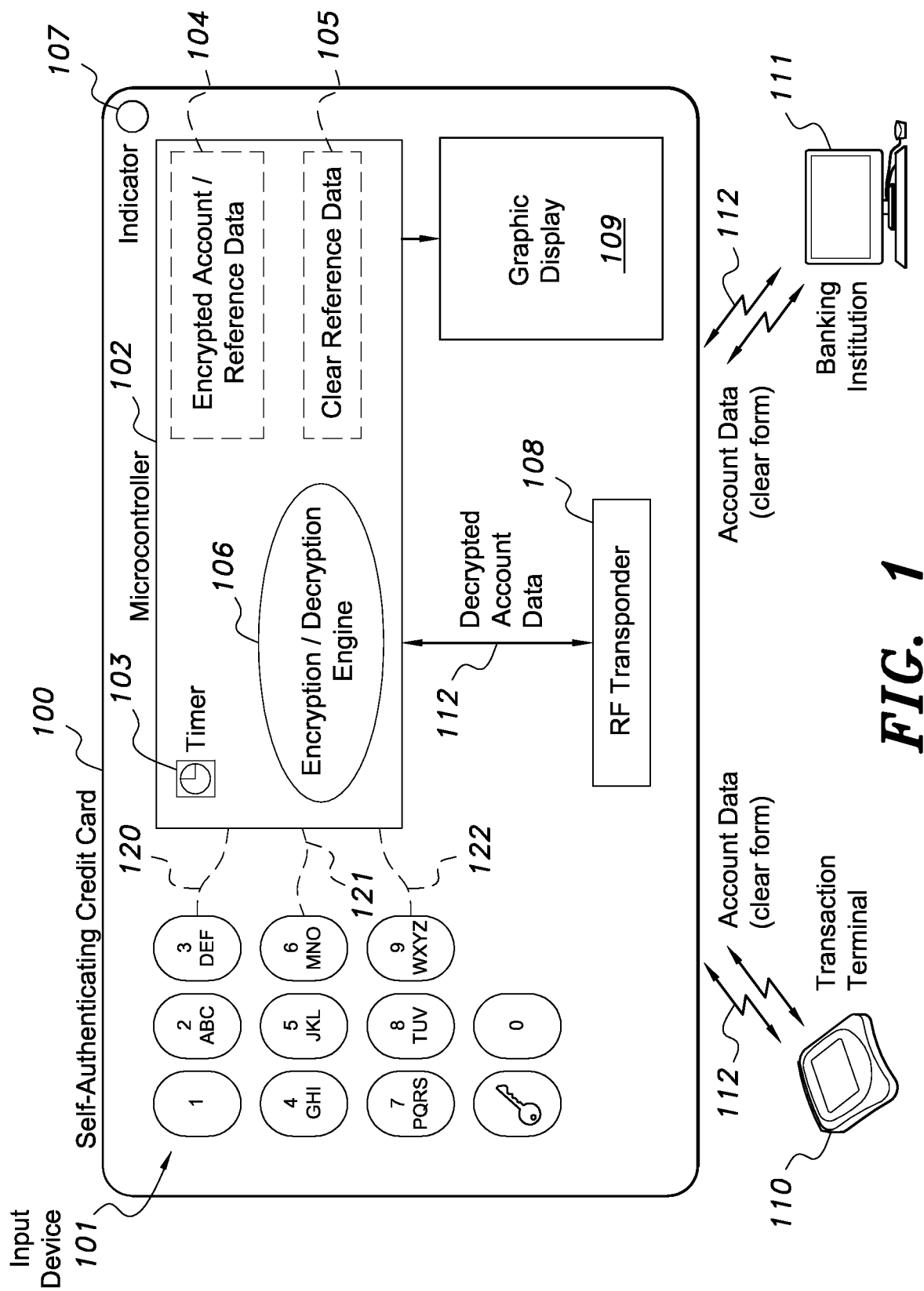
FIG. 1 schematically depicts a self-authenticating credit card with an integrated microcontroller, an integrated human interface device ("HID"), and an integrated output display.

FIG. 1 schematically depicts a self-authenticating credit card 100 with an integrated micro-controller 102, an input device 101 which is an integrated human interface device ("HID"), and a graphic display 109 which is an integrated output display. The self-authenticating credit card 100 includes an indicator 107, and an RF transponder 108.

The self-authenticating credit card 100 is shown schematically as being in two-way communication of account data 112 (in clear form) with a banking institution 111, and two-way communication of account data 112 (in clear form) with a transaction terminal 110. It will be understood that the terminal is exemplary, as is the banking institution shown, and it is contemplated that the present inventive self-authenticating credit card 100 would work with other types of suitable transaction terminals and with any banking institutions capable of accepting this type of credit card.

The micro-controller 102 includes a timer 103, encrypted account/reference data 104, clear reference data 105, and an encryption/decryption engine 106. The RF transponder 108 provides two-way communication of decrypted account data 112.

More specifically, FIG. 1 schematically depicts a self-authenticating credit card 100 showing the input device 101 as a series of alpha-numeric buttons (namely buttons 0-9 and a button with a key symbol shown thereon) connected to the micro-controller 102, the connection being indicated schematically by dashed lines 120, 121, and 122. It will be understood that the actual connection between the input device 101 and the micro-controller 102 can be of any type which would be within the ambit of skill of anyone having skill in the numeric keypad electronic interface arts.

The micro-controller 102 is equipped with non-volatile memory used to store the encrypted account data 104. The account data 104 preferably includes of a number of different numeric elements describing a customer account.

For example, the encrypted account data 104 preferably includes the following:
Name and address
Account number
Customer photograph
Customer signature
Expiration date The account data 104 is held in non-volatile memory in its encrypted form. Clear reference data 105 is stored in non-volatile memory, and is an arbitrary known string which is also included as account data when the encrypted account data 104 is created. That is, in addition to the aforementioned account data, the account data 104 also includes the identical arbitrary known string, all in encrypted form.

Since reference data 104 is present in both its cypher and clear forms, it is used to verify correct PIN entry. A PIN is entered via the input device 101 and received by the micro-controller 102. The entered PIN is used as an encryption key to decrypt account data 104 with the encryption/decryption engine 106, e.g. using an AES-128 (Advanced Encryption Standard). Other types of encryption can be employed as well, and all such variations are contemplated as being within the ambit of any one skilled in the electronic encryption arts.

For example, specific account data 104 is encrypted using PIN=1234. If the user enters the correct PIN number (here, 1234), then the decrypted reference data contained within the account data 104 will match the clear reference data 105 permanently held in clear form. If the user enters 1233 (for instance), then no match will occur, and it will be presumed that an incorrect PIN was input.

Cryptographers generally do not believe doing a direct compare of an entered PIN with a PIN stored in memory is secure, inasmuch as a compromised memory will yield a means of accessing account data. That is, a skilled person might fraudulently access the memory, and thereby gain knowledge of the data in the memory. Therefore, it is desirable to make an indirect comparison, wherein knowledge of the data in the clear memory is useless since the encrypted memory will differ unless that data in the encrypted memory is first decrypted by entry of a correct PIN. This is as described in the preceding discussion.

The RF transponder 108 is provided for communication with the transaction terminal 110, as mentioned above. The micro-controller 102 will respond to requests to transmit account data 112 at any time. If the user has not input the correct PIN, garbled account data will be sent to the transaction terminal 110 resulting in a rejected purchase request. If, on the other hand, a correct PIN was entered, correct account data 112 will be sent to the transaction terminal 110.

A timer 103 is provided to limit the time account data 112 resides in memory in clear form. The timer 103 starts at the time a PIN is entered. Decrypted account data 112 residing in memory will get erased once the timer expires. A period for expiration is selected to provide adequate time to complete a transaction and short enough to prevent unauthorized access if the card is lost or stolen. This period of time can be selected, by way of an example, to be on the order of tens of seconds or even up to several minutes. Longer time periods, while possible, are inadvisable because of the risk of loss of the card.

The graphic display 109 allows rendering of a customer's picture ID once a correct PIN is entered. A digitized photograph taken at one's banking institution is coupled with the aforementioned exemplary account data which is also then encrypted with a default PIN to create the account data 104. Decryption of this account data 104, by use of the correct PIN, will restore the correct digital representation of a customer likeness which will be rendered on the graphic display 109. Furthermore, the present invention contemplates that digitized representation of the customer's signature can also be used in addition to customer photo for display by the graphic display 109, and such display can be together, or sequential, or in an alternating form. Other types of information can optionally also be provided, and all such variations are within the ambit of any one having skill in the art of electronic displays.

An optional indicator 107 is provided to indicate correct or incorrect PIN entry. The correct PIN entry will result in the indicator lighting up and/or changing from one condition to another condition. If graphic content is rendered on graphic display 109, indicator 107 may not be necessary since a correct PIN will yield the correct customer likeness. If an incorrect PIN is used to decrypt account data 104, the image on the display 109 will appear as random dots (e.g. like "snow" on a TV) thereby providing visual feedback of correct or incorrect PIN entry.

When distributing the self-authenticating credit card 100, the dispensing bank will need to load the account data. The procedure is preferably performed via the RF transponder 108 that is used as a receiver. The account data in clear form is sent from the banking institution's computer 111 to the self-authenticating credit card 100 via the RF transponder 108. The account data is accompanied with a default PIN which the encryption/decryption engine 106 uses to encrypt received account data (that is, which is received in clear form) so as to encrypt that data so as to create account data 104 in a cypher form (that is, in encrypted form). Once the card 100 is distributed, it becomes possible for the customer to change their PIN in the manner shown and referenced in FIG. 3, discussed further hereunder.

Figure 2:
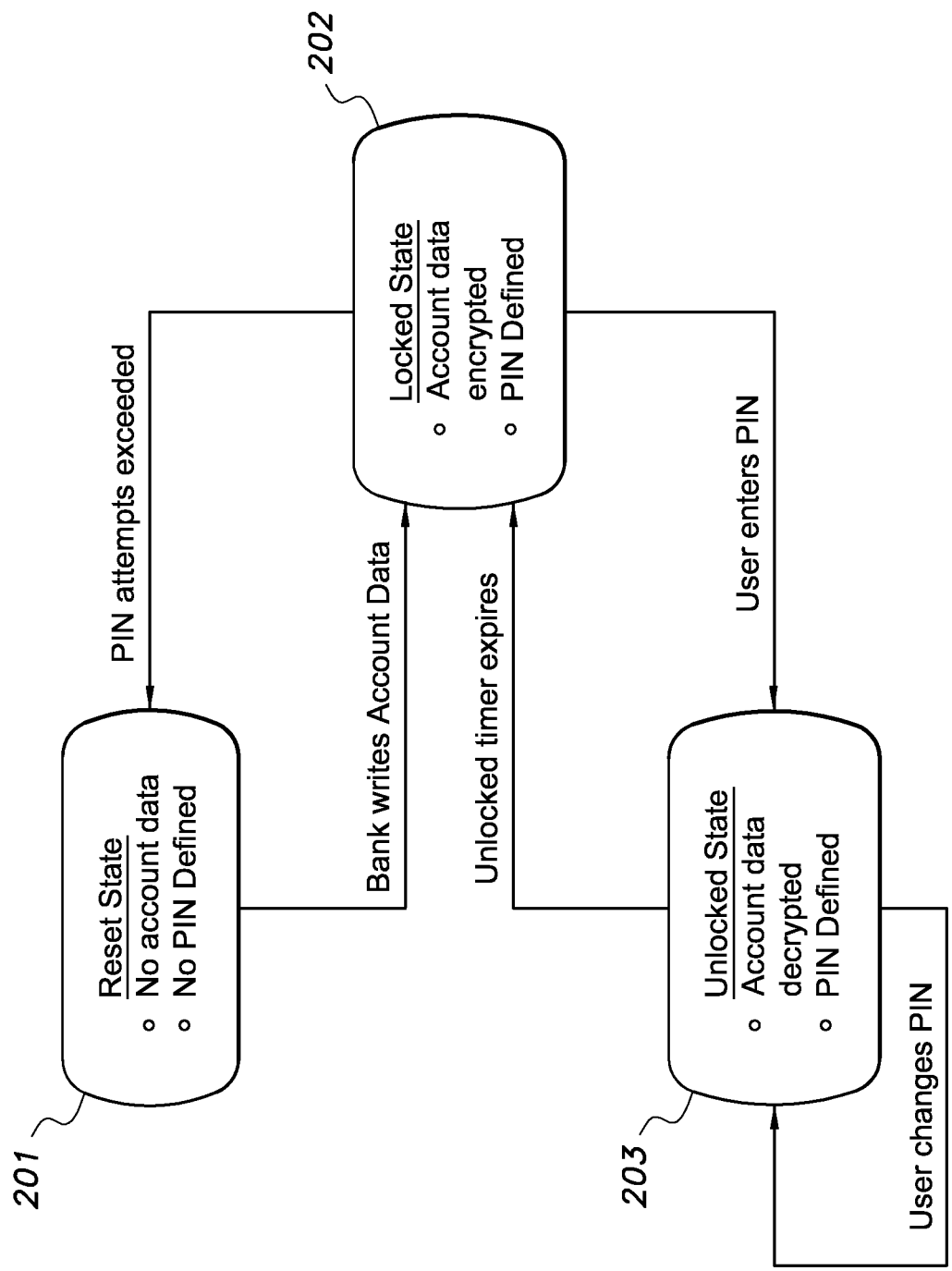
FIG. 2 represents a state diagram showing the different states of a self-authenticating credit card.

FIG. 2 represents a state diagram showing three states of the SACC (Self-Authenticating Credit Card) 100 as a preferred embodiment of the present invention. Deployment starts at a reset state 201. Here, no account data is present and all memory is zeroized (zeroizing is the act of overwriting all critical data with zeros). An RF communication link is then established between the SACC 100 and the banking institution computer 111 in the manner discussed hereinabove. Customer data, along with a default PIN, is then written to the card 100 by the banking institution computer 111. The known reference data 105 is concatenated with the received clear account data, is encrypted by the encryption/decryption engine 106 with the default PIN, and is stored in non-volatile memory to become the encrypted account data 104. Once the account data 104 has been written successfully, the SACC 100 enters the locked state 202 and is ready for use.

In the locked state 202, the account data 104 is not accessible in clear form to the outside world until the user enters a correct PIN. A request from the transaction terminal 110 to transmit account information will cause the SACC 100 to transmit account data 112 which is in its zeroized state, and will therefore be rejected by the credit authorization facility; the transaction terminal 110 will therefore indicate an error.

In order to provide legitimate account data 112 to the transaction terminal 110, the SACC 100 must be unlocked by entering a correct PIN. Once the correct PIN is entered, the SACC 100 will transition to the unlocked state 203. If entry of the correct PIN fails a predetermined number of times, the SACC 100 will zeroize account data 104 and render itself inoperable. At this point, the SACC 100 must be returned to the banking institution for re-creation of valid account data 104.

The steps and operations discussed in the foregoing, and as further discussed below, are accomplished by programs and/or software stored in the micro-controller 102, and/or as part of the operating system of the micro-controller 102. These would be within the ambit of skill of any one having skill in the programming arts for micro-controllers for smart credit cards.

Figure 3:
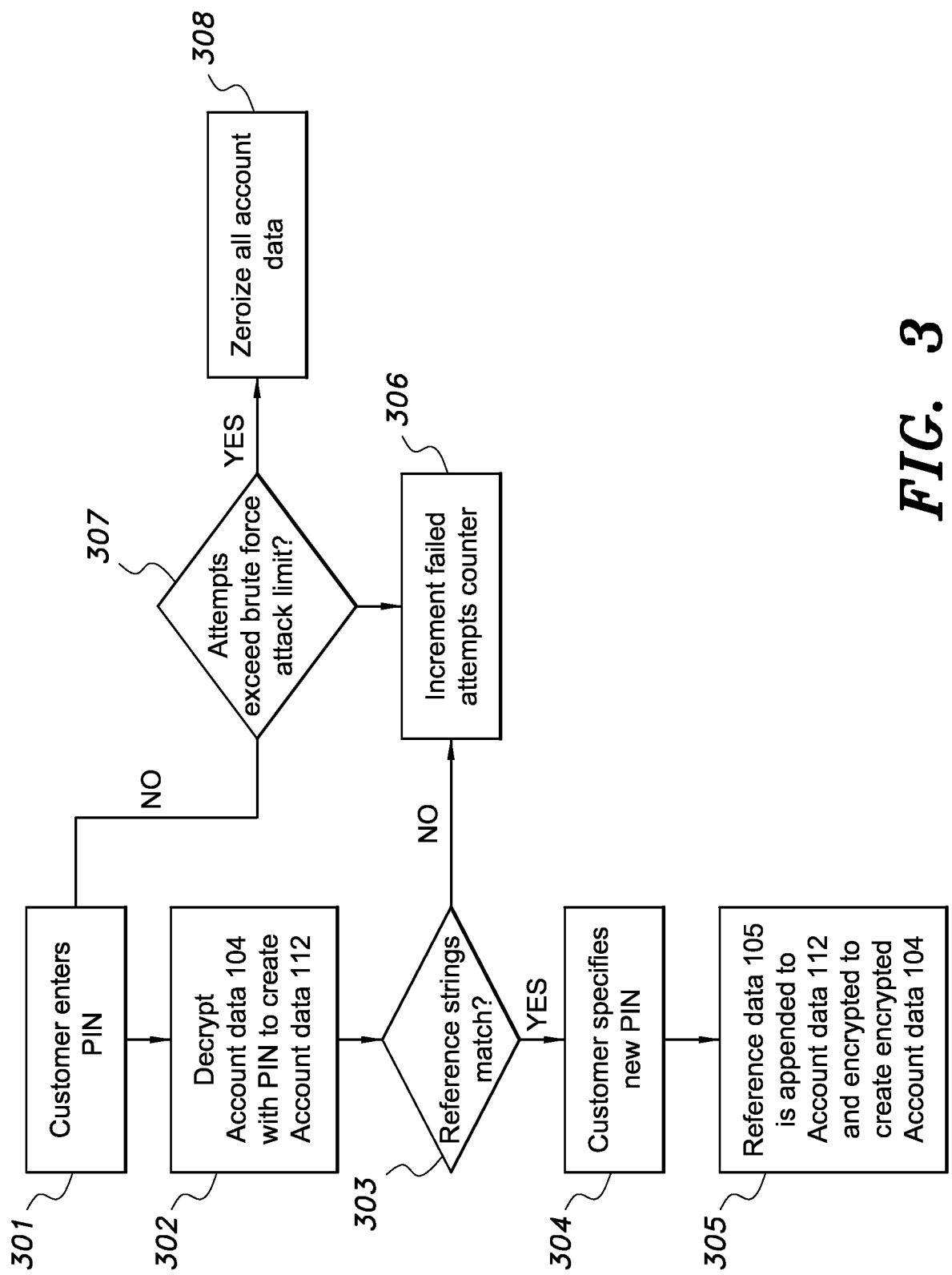
FIG. 3 represents a flow diagram showing processes of the micro-controller when a user changes their PIN.

Entry into the unlocked state 203 occurs when the correct user PIN has been entered via the input device 101. The PIN entry procedure and verification is shown in FIG. 3 and is discussed further hereunder. Once unlocked, the encryption/decryption engine 106 creates account data in clear form 112 from the account data 104 (which exists in cypher form) and the user is thereby able to transmit legitimate account data (in a clear form) to the transaction terminal 110.

In addition, once the unlocked state occurs, the user is able to define a new PIN. A four digit PIN has a chance of $1/10000$ of being guessed and is not considered cryptographically secure. Therefore, the user is encouraged to create a custom PIN with more digits/characters. Alpha characters, as well as numeric characters, are preferably supplied on the keys of the input device 101 allowing creation of PINs that are easier to remember.

Upon entry into the unlocked state 203, the timer 103 is started providing a means of limiting the time in which the SACC 100 remains in the unlocked state 203. Once the predetermined amount of time (as measured by the timer 103) expires, the account data in clear form 112 is zeroized and the SACC 100 reverts back to its locked state 202.

FIG. 3 diagrammatically shows the process of entry into the unlocked state 203. The process starts in the locked state 202 whereupon the customer enters a PIN as depicted in step 301. Once a PIN has been received, the micro-controller 102 decrypts the account data 104 at step 302 to create account data 112 in clear form and which also thereby creates the encrypted reference data in a clear form as well to form decrypted reference data. If the decrypted reference data matches the reference data 105, then the correct PIN has been received; this test is shown in step 303.

Assuming that the correct PIN is entered as determined at step 303, then the SACC 100 is in the unlocked state 203. In this unlocked state, the user can define a new PIN as shown in step 304. The new PIN will be used to encrypt the account data 112 together with the known reference data 105 to create new encrypted account data 104 as depicted in step 305.

If the decrypted reference data does not match the clear reference data 105 in step 303, a failed-attempts counter is incremented at step 306 and compared with a brute force attack limit (the brute force attack limit being a predetermined number of failed attempts) in step 307. If the failed attempts exceeds the brute force attack limit at step 307, then all account parameters are zeroized as indicated in step 308, at which point the SACC 100 is no longer operable and requires reconfiguration by the issuing bank.

The foregoing embodiments are described in sufficient detail to enable those skilled in the art to make and use the invention, and it is to be understood that other embodiments would be evident based on the present disclosure and that process or mechanical changes may be made without departing from the scope of the present invention.

In the foregoing description, numerous specific details are given to provide a thorough understanding of the invention. However, it will be apparent that the invention may be practiced without these specific details. In order to avoid obscuring the present invention, some well-known circuits, system configurations, and process steps are not shown in detail and would be understood by any one having skill in the relevant art.

The device 100 of the present invention can be powered by a self-contained battery (not shown), or can be externally powered by RF energy or microwave energy (not shown), or can draw power from a terminal which reads the device.

Likewise, the drawings showing embodiments of the apparatus/device are semi-diagrammatic and not to scale and, particularly, some of the dimensions are for clarity of presentation and may be shown greatly exaggerated in the drawings.

While the invention has been described in conjunction with a specific preferred embodiment which is considered to be the best mode, it is to be understood that many alternatives, modifications, and variations will be apparent to those skilled in the art in light of the foregoing description and accompanying drawings. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A self-authenticating credit card comprising:
    an input device;
    a micro-controller coupled to the input device, said micro-controller having a failed attempt counter for counting a number of incorrect PIN entries, a non-volatile memory, and an encryption/decryption engine, the non-volatile memory being configured for storing an encrypted account number, a reference data string, and an encrypted reference data string, wherein access to the account number is locked until a correct PIN is received, wherein the account number is not stored in clear form in the self-authenticating credit card while the self-authenticating credit card is locked, wherein the account number may not be obtained by fraudulent access to the non-volatile memory while the self-authenticating credit card is locked, wherein the account number and the reference data string are encrypted with the correct PIN;
    an RF transponder, coupled to the micro-controller, configured to transmit the account number to a transaction terminal when access to the account number is unlocked; and
    a display, coupled to the micro-controller, configured to show the account number in clear form when access to the account number is unlocked;
    wherein said micro-controller is configured to:
    receive a user PIN from the input device,
    decrypt, using the received user PIN, the encrypted reference data string and the encrypted account number to convert the stored encrypted account number to clear form,
    unlock access to the account number when the decrypting of the encrypted reference data string is equal to the reference data string stored in the non-volatile memory, wherein the self-authenticating credit card may not be used to make purchases when lost or stolen, based on the unlock of access, transfer the account number to the display and enable transmission of the account number in clear form to the transaction terminal, increment the failed attempt counter when the decryption of the encrypted reference data string is not equal to the stored reference data string, and clear the account number and the encrypted account number from the self-authenticating credit card when the failed attempt counter exceeds a predetermined limit.

2. The self-authenticating credit card as claimed in claim 1, wherein said micro-controller is further configured to receive a Previously Presented PIN, while access is unlocked, wherein the Previously Presented PIN is used as an encryption key to encrypt the account number and the reference data string for storage in the non-volatile memory, such that a user can make the Previously Presented PIN become the correct PIN.

3. The self-authenticating credit card as claimed in claim 1, further comprising an indicator for providing a visual indication when access is unlocked.

4. The self-authenticating credit card as claimed in claim 1, wherein the correct PIN is configurable to be of variable length and content.

5. The self-authenticating credit card as claimed in claim 1, further comprising a reset state in which the account number is absent from non-volatile memory in either encrypted or decrypted form.

6. The self-authenticating credit card as claimed in claim 1, wherein said micro-controller is further configured to receive the account number from a banking institution via the RF transponder, encrypting said account number by the encryption/decryption engine, and storing the encrypted account number in the non-volatile memory.

7. The self-authenticating credit card as claimed in claim 1, wherein the non-volatile memory is further configured to store a photograph of an account holder, wherein the photograph of the account holder is transmitted to the display when access to the account number is unlocked.

8. A method comprising:

receiving, by a micro-controller in a self-authenticating credit card, a user PIN from an input device, the self-authenticating credit card further comprising an RF transponder and a display, said micro-controller having a failed attempt counter for counting a number of incorrect PIN entries, a non-volatile memory, and an encryption/decryption engine, the non-volatile memory being configured for storing an encrypted account number, a reference data string, and an encrypted reference data string, wherein access to the account number is locked until a correct PIN is received, wherein the account number is not stored in clear form in the self-authenticating credit card while the self-authenticating credit card is locked, wherein the account number may not be obtained by fraudulent access to the non-volatile memory while the self-authenticating credit card is locked, wherein the account number and the reference data string are encrypted with the correct PIN;

decrypting, by the micro controller in the self-authenticating credit card, using the received user PIN, the encrypted reference data string and the encrypted account number to convert the stored encrypted account number to clear form;

unlocking access to the account number when the decrypting of the encrypted reference data string is equal to the reference data string stored in the non-volatile memory;

based on the unlocking access, transferring the account number to the display and enabling transmission of the account number to a transaction terminal via the RF transponder, wherein the self-authenticating credit card may not be used to make purchases when lost or stolen;

incrementing the failed attempt counter when the decrypting of the encrypted reference data string is not equal to the reference data string; and clearing the account number and the encrypted account number from the self-authenticating credit card when the failed attempt counter exceeds a predetermined limit.

9. The method as recited in claim 8, wherein said micro-controller is further configured to receive a Previously Presented PIN, while access is unlocked, wherein the Previously Presented PIN is used as an encryption key to encrypt the account number and the reference data string for storage in the non-volatile memory, such that a user can make the Previously Presented PIN become the correct PIN.

10. The method as recited in claim 8, further comprising an indicator for providing a visual indication when access is unlocked.

11. The method as recited in claim 8, wherein the correct PIN is configurable to be of variable length and content.

12. The method as recited in claim 8, wherein the self-authenticating credit card includes a reset state in which the account number is absent from non-volatile memory in either encrypted or decrypted form.

13. The method as recited in claim 8, wherein said micro-controller is further configured to receive the account number from a banking institution via the RF transponder, encrypting said account number by the encryption/decryption engine, and storing the encrypted account number in the non-volatile memory.

14. The method as recited in claim 8, wherein the non-volatile memory is further configured to store a photograph of an account holder, wherein the photograph of the account holder is transmitted to the display when access to the account number is unlocked.

15. A non-transitory machine-readable storage medium including instructions that, when executed by a machine, cause the machine to perform operations comprising:

receiving, by a micro-controller in a self-authenticating credit card, a user PIN from an input device, the self-authenticating credit card further comprising an RF transponder and a display, said micro-controller having a failed attempt counter for counting a number of incorrect PIN entries, a non-volatile memory, and an encryption/decryption engine, the non-volatile memory being configured for storing an encrypted account number, a reference data string, and an encrypted reference data string, wherein access to the account number is locked until a correct PIN is received, wherein the account number is not stored in clear form in the self-authenticating credit card while the self-authenticating credit card is locked, wherein the account number may not be obtained by fraudulent access to the non-volatile memory while the self-authenticating credit card is locked, wherein the account number and the reference data string are encrypted with the correct PIN;

decrypting, by the micro controller in the self-authenticating credit card, using the received user PIN, the encrypted reference data string and the encrypted account number to convert the stored encrypted account number to clear form;

unlocking access to the account number when the decrypting of the encrypted reference data string is equal to the reference data string stored in the non-volatile memory, wherein the self-authenticating credit card may not be used to make purchases when lost or stolen;

based on the unlocking access, transferring the account number to the display and enabling transmission of the account number to a transaction terminal via the RF transponder;

incrementing the failed attempt counter when the decrypting of the encrypted reference data string is not equal to the stored reference data string; and clearing the account number and the encrypted account number from the self-authenticating credit card when the failed attempt counter exceeds a predetermined limit.

16. The machine-readable storage medium as recited in claim 15, wherein said micro-controller is further configured to receive a Previously Presented PIN, while access is unlocked, wherein the Previously Presented PIN is used as an encryption key to encrypt the account number and the reference data string for storage in the non-volatile memory, such that a user can make the Previously Presented PIN become the correct PIN.

17. The machine-readable storage medium as recited in claim 15, wherein the self-authenticating credit card further comprises an indicator for providing a visual indication when access is unlocked.

18. The machine-readable storage medium as recited in claim 15, wherein the correct PIN is configurable to be of variable length and content.

19. The machine-readable storage medium as recited in claim 15, wherein the self-authenticating credit card includes a reset state in which the account number is absent from non-volatile memory in either encrypted or decrypted form.

20. The machine-readable storage medium as recited in claim 15, further comprising:

receiving the account number from a banking institution via the RF transponder;

encrypting said received account number by the encryption/decryption engine; and storing the encrypted account number in the non-volatile memory.

* * * * *